(12) United States Patent
Sonoda (10) Patent No.: US 9,367,045 B2
(45) Date of Patent: Jun. 14, 2016

(54) SERVO CONTROL SYSTEM FOR GRINDING INCLINED SURFACE

(71) Applicant: FANUC Corporation, Yamanashi (JP)

(72) Inventor: Naoto Sonoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/555,948

(22) Filed: Nov. 28, 2014

(65) Prior Publication Data

US 2015/0153713 A1   Jun. 4, 2015

(30) Foreign Application Priority Data

Nov. 29, 2013   (JP) .................................. 2013-248330

(51) Int. Cl.
G05B 19/18   (2006.01)
G05B 1/03   (2006.01)

(52) U.S. Cl.
CPC .......................................... *G05B 1/03* (2013.01)

(58) Field of Classification Search
CPC ............ B29B 49/00; G05B 1/03; B24B 7/00; B24B 41/06; B24B 53/02; B24B 49/00
USPC ......... 318/560, 569, 600, 700, 721, 779, 799, 318/400.01, 400.14, 432, 268; 125/11.16; 264/655, 678, 162; 483/30; 700/164
See application file for complete search history.

(56) References Cited

U.S. PATENT DOCUMENTS 7,479,750 B2 *   1/2009   Iwashita .............. G05B 19/404
                                                                318/560

FOREIGN PATENT DOCUMENTS

| CN | 202548604 U | 11/2012 |
| JP | H06-214633 A | 8/1994 |
| JP | H06-262483 A | 9/1994 |
| JP | 2011-123616 A | 6/2011 |
| JP | 2011-194552 A | 10/2011 |
| JP | 2012-58824 A | 3/2012 |

* cited by examiner

*Primary Examiner* — Antony M Paul
(74) *Attorney, Agent, or Firm* — Hauptman Ham, LLP (57) ABSTRACT

Servo control system includes a first repeat control unit for a first servo motor based on a reference angle and a first position error between a swing command and a position of the first servo motor, a multiplication unit which multiplies the swing command by a ratio according to a tilt angle of an inclined surface of a material to be ground to calculate a swing command after multiplication, and a second repeat control unit for a second servo motor based on a reference angle and second position error between the swing command after multiplication and a position of the second servo motor. The first and the second position error are respectively corrected, and driving of the first and the second servo motors are controlled based on the corrected first and second position error, thereby grinding the inclined surface of the material.

3 Claims, 9 Drawing Sheets

SERVO CONTROL SYSTEM FOR GRINDING INCLINED SURFACE

RELATED APPLICATIONS

The present application claims priority to Japanese Application Number 2013-248330, filed Nov. 29, 2013, the disclosure of which is hereby incorporated by reference herein in its entirety.

BACKGROUND OF THE INVENTION

1. Field of the Invention

The present invention relates to a servo control system for controlling a servo motor of a machine tool grinding an inclined surface.

2. Description of the Related Art

Generally, in a surface grinder, a horizontally disposed workpiece is swung with respect to a fixed grindstone, and thereby a plane surface of the workpiece is ground. Alternatively, the workpiece may be ground by swinging the grindstone with respect to the fixed workpiece. A numerical controller connected to the surface grinder controls a motor for a swing shaft for swinging the workpiece or the grindstone and a motor for a feed shaft for feeding the workpiece or the grindstone in a direction perpendicular to the swing shaft.

Figure 9:
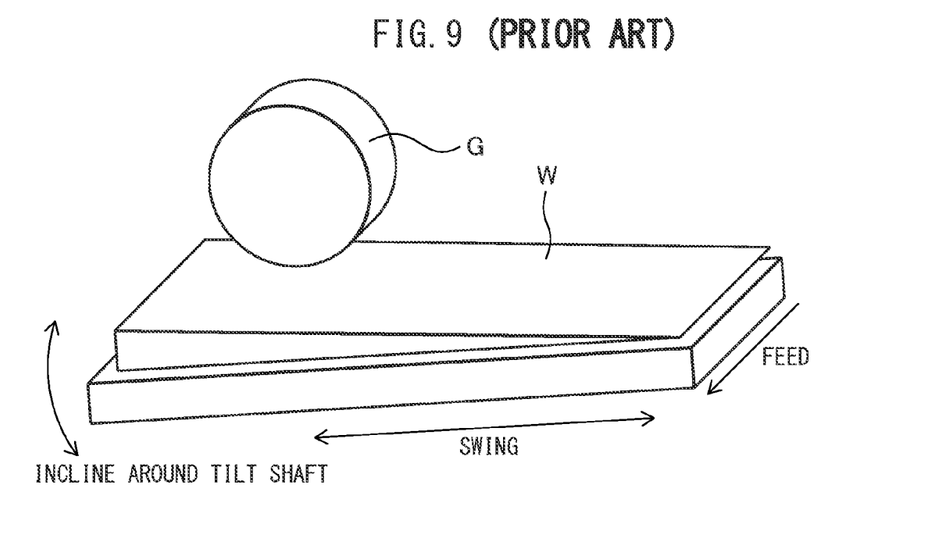
FIG. 9 is a schematic diagram illustrating a workpiece and a grindstone according to a conventional technique.

FIG. 9 is a schematic diagram illustrating a workpiece and a grindstone according to the conventional technique disclosed in Japanese Laid-open Patent Publication No. 2011-194552. As illustrated in FIG. 9, when an inclined surface of a workpiece W is ground, the workpiece W is inclined around a tilt shaft. Accordingly, as in the case of grinding the plane surface, the inclined surface of the workpiece W can be ground by a grindstone G.

Figure 10A:
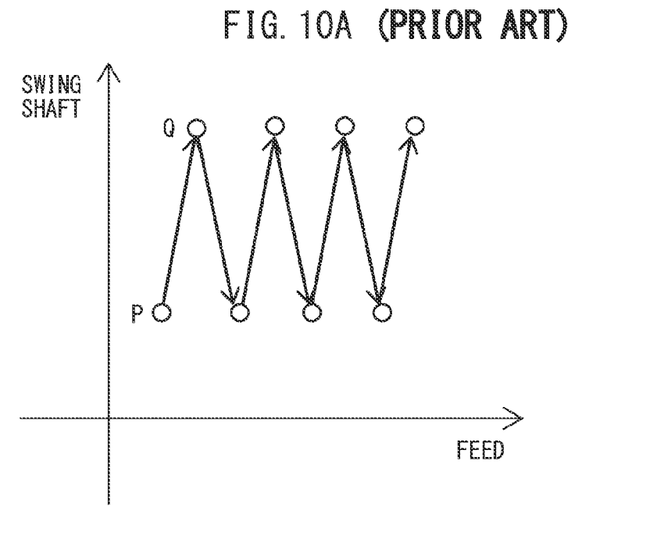
FIG. 10A is a graph illustrating a relationship between a feed position of a feed shaft and a position of a swing shaft according to the conventional technique.
Figure 10B:
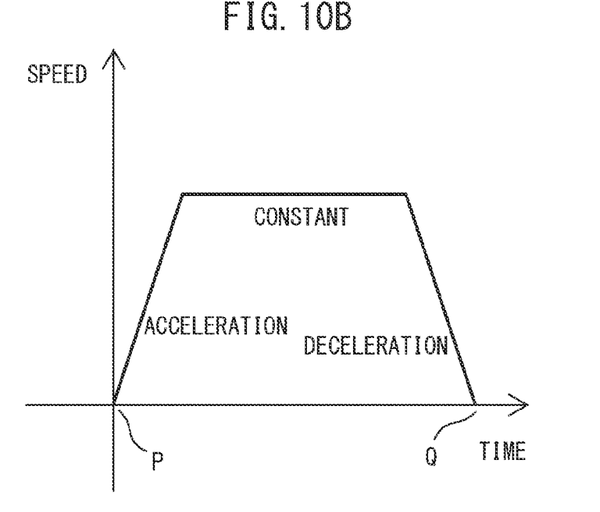
FIG. 10B is a graph illustrating a relationship between time and a speed during movement from a point P to a point Q illustrated in FIG. 10A.

FIG. 10A is a graph illustrating a relationship between a feed position of a feed shaft and a position of the swing shaft according to the conventional technique. As illustrated in FIG. 10A, motion of the swing shaft in the surface grinding is represented by a saw-tooth shape where the swing shaft moves back and forth from one end of the workpiece to the other end. A moving speed of the grindstone from a point P to a point Q in FIG. 10A is approximately constant as illustrated in FIG. 10B. This case is advantageous in that a grinding amount during the grinding is constant.

However, in the configuration illustrated in FIG. 9, a tilt shaft is necessary in addition to the swing shaft and the feed shaft. As a result, the grinder including the swing shaft, the feed shaft, and the tilt shaft has a problem that a configuration thereof is specialized only for grinding a plane surface such as an inclined surface.

As can be understood from FIG. 10A, due to larger torque at the time of acceleration/deceleration, there is a limit to move the grindstone along the swing shaft at a high speed. Moreover, the moving speed suddenly changes, especially at the point P and the point Q. Thus, when the grindstone is moved along the swing shaft at a high speed, a problem of undershoot or overshoot may occur at turns such as the point P and the point Q. This problem may also occur when grinding a conical surface of a conical or truncated cone workpiece (not illustrated) by a cylindrical grinder.

The present invention has been made in view of such circumstances, and has an object to provide a servo control system capable of grinding an inclined surface without needing a tilt shaft and without generating any undershoot or overshoot at turns.

SUMMARY OF THE INVENTION

In order to achieve the object, according to a first aspect of the present invention, a servo control system for controlling a servo motor of a machine tool for grinding an inclined surface of a material to be ground by a grindstone, the servo control system including, a first servo motor configured to swing one of the grindstone and the material to be ground along a first swing shaft, a first position detection unit configured to detect a position of the first servo motor, a first servo motor control unit configured to control the first servo motor, a second servo motor configured to swing the one of the grindstone and the material to be ground along a second swing shaft perpendicular to the first swing shaft, a second position detection unit configured to detect a position of the second servo motor, a second servo motor control unit configured to control the second servo motor, a reference angle calculation unit configured to calculate a reference angle based on a command angular speed and a command distribution cycle acquired from processing conditions, a swing command calculation unit configured to calculate a cyclical swing command based on the processing conditions and the reference angle, a first supply unit configured to supply the reference angle and the swing command to the first servo motor control unit, a first position error calculation unit configured to calculate first position error between the swing command and the position of the first servo motor detected by the first position detection unit for each sampling cycle, a first repeat control unit configured to execute repeat control for the first servo motor based on the reference angle, the swing command, and the first position error, a multiplication unit configured to multiply the swing command by a ratio according to a tilt angle of the inclined surface of the material to be ground to calculate a swing command after multiplication, a second supply unit configured to supply the reference angle and the swing command after multiplication to the second servo motor control unit, a second position error calculation unit configured to calculate a second position error between the swing command after multiplication and the position of the second servo motor detected by the second position detection unit for each sampling cycle, and a second repeat control unit configured to execute repeat control for the second servo motor based on the reference angle, the swing command after multiplication, and the second position error. The first repeat control unit and the second repeat control unit respectively correct the first position error and the second position error, and control driving of the first servo motor and the second servo motor based on the corrected first position error and the corrected second position error, thereby grinding the inclined surface of the material to be ground.

According to a second aspect of the present invention, in the servo control system according to the first aspect, the first repeat control unit includes a first time angle conversion unit configured to convert the first position error acquired for each sampling cycle into an error for each reference angle, a first correction amount calculation unit configured to calculate a correction amount in the reference angle from the error for each reference angle, a first correction amount storage unit configured to store correction amounts at least for one cycle of the grindstone or the material to be ground, which is cyclically swung, a first angle time conversion unit configured to convert the correction amount stored in the first correction amount storage unit into a correction amount for each sampling cycle, and a first phase advance filer configured to advance a phase of the converted correction amount converted by the first angle time conversion unit. The second repeat control unit includes a second time angle conversion unit configured to convert the second position error acquired for each sampling cycle into error for each reference angle, a second correction amount calculation unit configured to calculate a correction amount in the reference angle from the error for each reference angle, a second correction amount storage unit configured to store correction amounts at least for one cycle of the grindstone or the material to be ground, which is cyclically swung, a second angle time conversion unit configured to convert the correction amount stored in the second correction amount storage unit into a correction amount for each sampling cycle, and a second phase advance filer configured to advance a phase of the converted correction amount converted by the second angle time conversion unit.

According to a third aspect of the present invention, in the servo control system according to the first aspect, the swing command has a sine wave shape.

BRIEF DESCRIPTION OF THE DRAWINGS

The above objects, features, and advantages, and other objects, features, and advantages of the present invention will become more apparent from the following detailed description of the exemplary embodiments of the present invention taken in connection with the accompanying drawings, in which.

DETAILED DESCRIPTION

Hereinafter, embodiments of the present invention will be described with reference to the accompanying drawings. In the drawings below, same or similar members are denoted by same or similar reference signs. For easier understanding, reductions of the drawings are appropriately changed.

Figure 1:
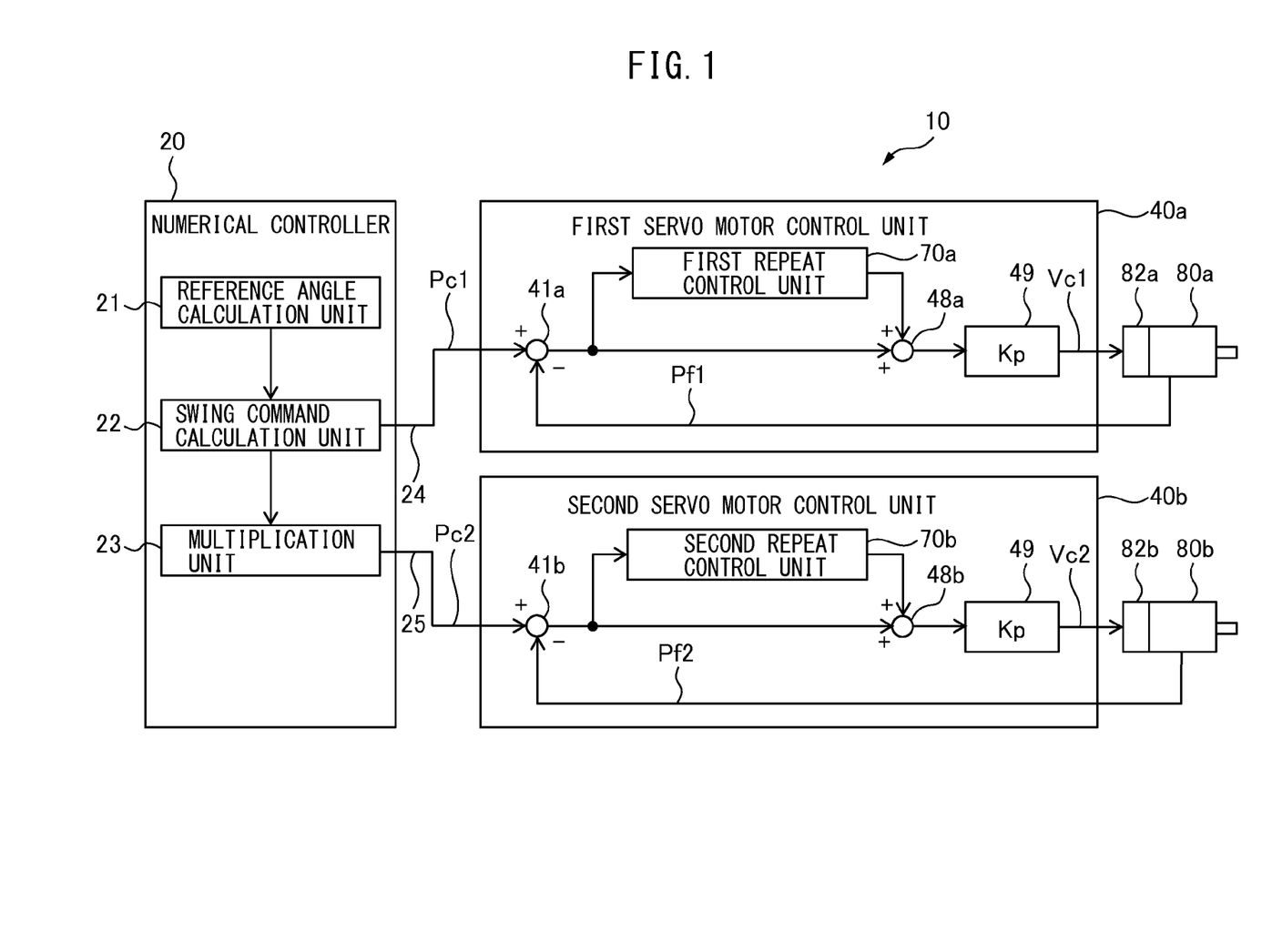
FIG. 1 is a block diagram illustrating a servo control system according to the present invention.

FIG. 1 is a block diagram illustrating a servo control system according to the present invention. The servo control system 10 includes a numerical controller 20, a first servo motor 80a relating to an X-direction swing shaft, a first servo motor control unit 40a configured to control the first servo motor 80a, a second servo motor 80b relating to an Y-direction swing shaft, and a second servo motor control unit 40b configured to control the second servo motor 80b.

As illustrated in FIG. 1, the numerical controller 20 calculates position commands Pc1 and Pc2 to respectively output the commands to the first servo motor control unit 40a and the second servo motor control unit 40b. The first servo motor 80a and the second servo motor 80b respectively include position detectors 82a and 82b configured to detect rotational positions of the respective motors.

As illustrated in FIG. 1, the numerical controller 20 includes a reference angle calculation unit 21 configured to calculate a reference angle based on a command angular speed and a command distribution cycle acquired from processing conditions, and a swing command calculation unit 22 configured to calculate a cyclical swing command based on the processing conditions and the reference angle. The numerical controller 20 further includes a multiplication unit 23 configured to multiply the swing command by a ratio according to a tilt angle $\beta$ of a workpiece W to calculate a swing command after multiplication.

Figure 2:
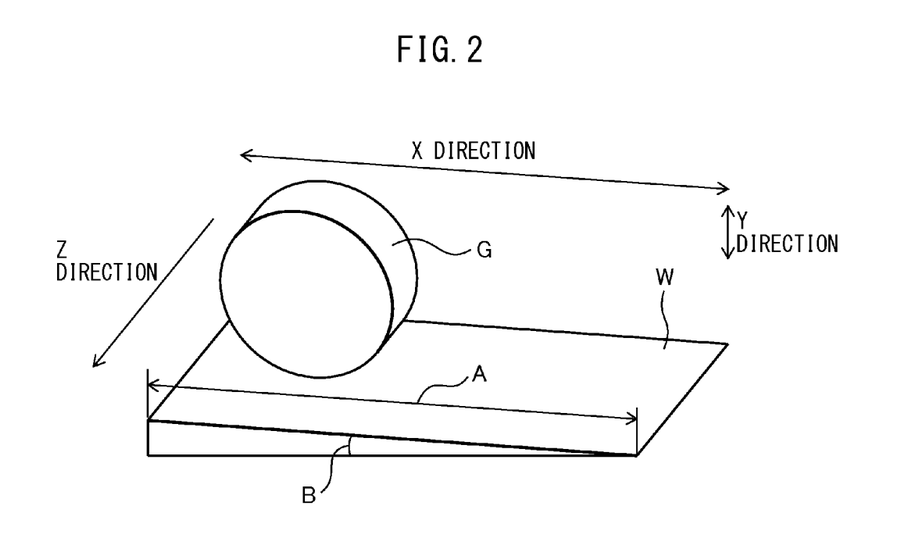
FIG. 2 is a diagram illustrating an example to which the servo control system of the present invention is applied.

FIG. 2 is a diagram illustrating an example to which the servo control system of the present invention is applied. As illustrated in FIG. 2, the servo control system 10 is used for controlling a machine tool or an industrial machine for processing an inclined surface of the fixed workpiece W by using a rotating grindstone G. A tilt angle between the inclined surface of the workpiece W and a horizontal surface illustrated in FIG. 2 is an angle $\beta$.

In FIG. 2, the grindstone G of the machine tool is swung in an X direction with respect to the workpiece W by the first servo motor 80a, and the grindstone G is swung in a Y direction perpendicular to the X direction with respect to the workpiece W by the second servo motor 80b. This enables grinding of the inclined surface of the workpiece W. When the grindstone G is fed in a Z direction perpendicular to the X direction and the Y direction, the entire inclined surface is ground. Note that the workpiece W may be swung with respect to the fixed grindstone G to grind the inclined surface of the workpiece W.

Figure 3:
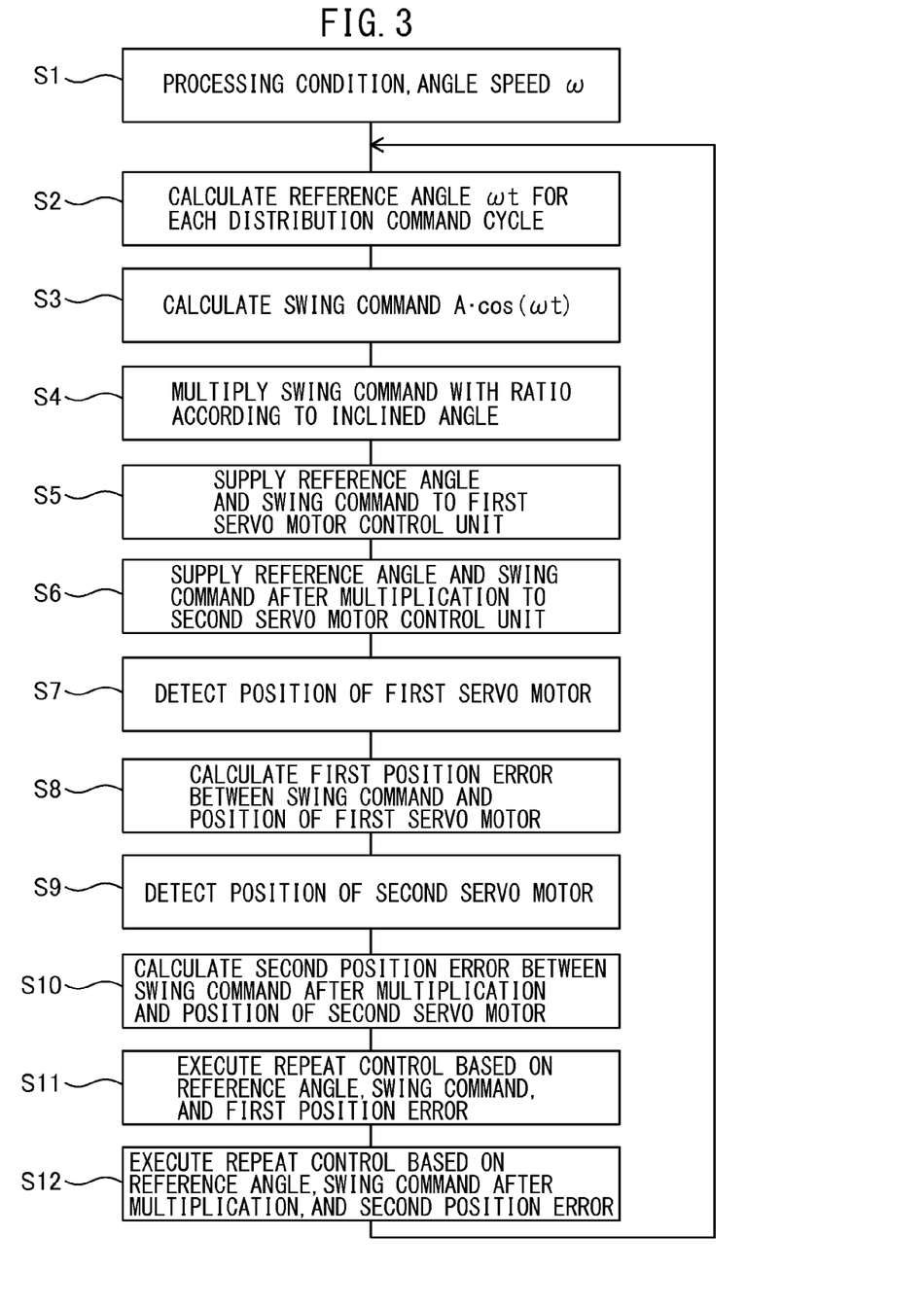
FIG. 3 is a flowchart illustrating an operation of the servo control system illustrated in FIG. 1.

FIG. 3 is a flowchart illustrating an operation of the servo control system illustrated in FIG. 1. Hereinafter, the operation of the servo control system according to the present invention will be described referring to FIGS. 1 and 3. As illustrated in FIG. 3, first, in step S1, the reference angle calculation unit 21 acquires a command angular speed $\omega$ and a command distribution cycle T from the processing conditions of the workpiece W. An operator may input the command angular speed $\omega$ and the command distribution cycle T by using an input unit (not illustrated) such as a keyboard. In step S2, the reference angle calculation unit 21 calculates certain time t=nT (n is natural number), and reference angle $\theta=\omega t$ from the angular speed $\omega$ for each command distribution cycle.

Then, in step S3, the swing command calculation unit 22 calculates a swing command based on the processing conditions and the reference angle. The swing command calculated by the swing command calculation unit 22 is, for example, a swing command $F(t)=A\cdot\cos(\omega t)$. Another swing command may be employed as long as a sine wave is used. A coefficient A is amplitude of the swing command $F(t)$, and uniquely set based on the processing conditions. As illustrated in FIG. 2, the coefficient A is, for example, a length of the workpiece W in the X direction.

Then, in step S4, the multiplication unit 23 multiplies the swing command $F(t)$ calculated by the swing command calculation unit 22 by a ratio according to a tilt angle of the inclined surface, for example, $\tan\beta$. Accordingly, the swing command after multiplication $F'(t)=A\cdot\tan\beta\cdot\cos(\omega t)$ is calculated.

Figure 4A:
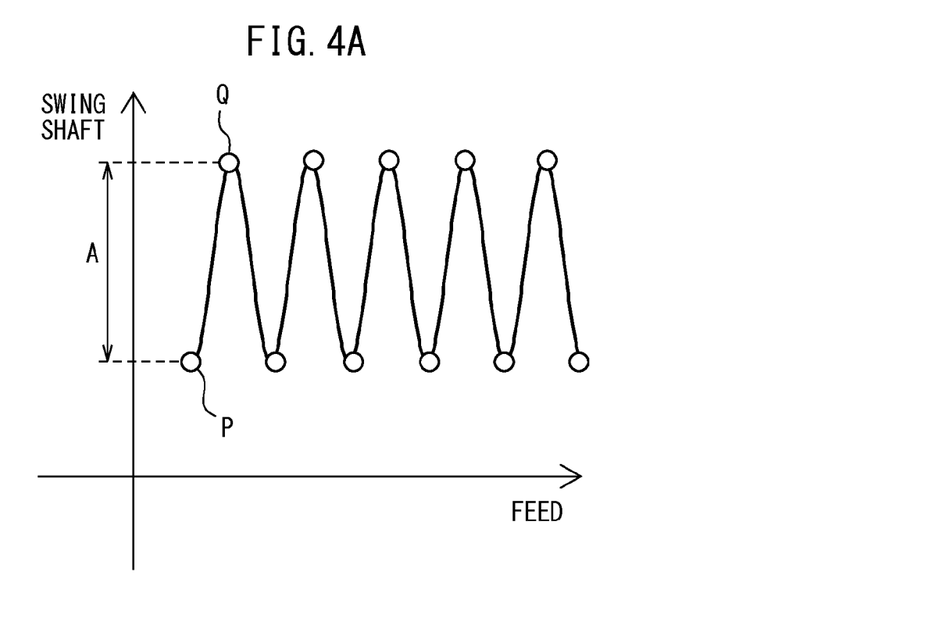
FIG. 4A is a graph illustrating a relationship between a feed position of a feed shaft and a position of one swing shaft according to the present invention.

FIG. 4A is a graph illustrating a relationship between a feed position of a feed shaft (Z direction) and a position of a swing shaft according to the present invention. The swing shaft illustrated in FIG. 4A is, for example, an X-direction swing shaft, and it is to be understood that the relation is approximately similar when the swing shaft is a Y-direction swing shaft. As illustrated in FIG. 4A, the swing command F(t) or the swing command after multiplication F'(t) has a sine wave shape, and thus servo responsiveness is improved even in the case of high-speed swinging.

Figure 4B:
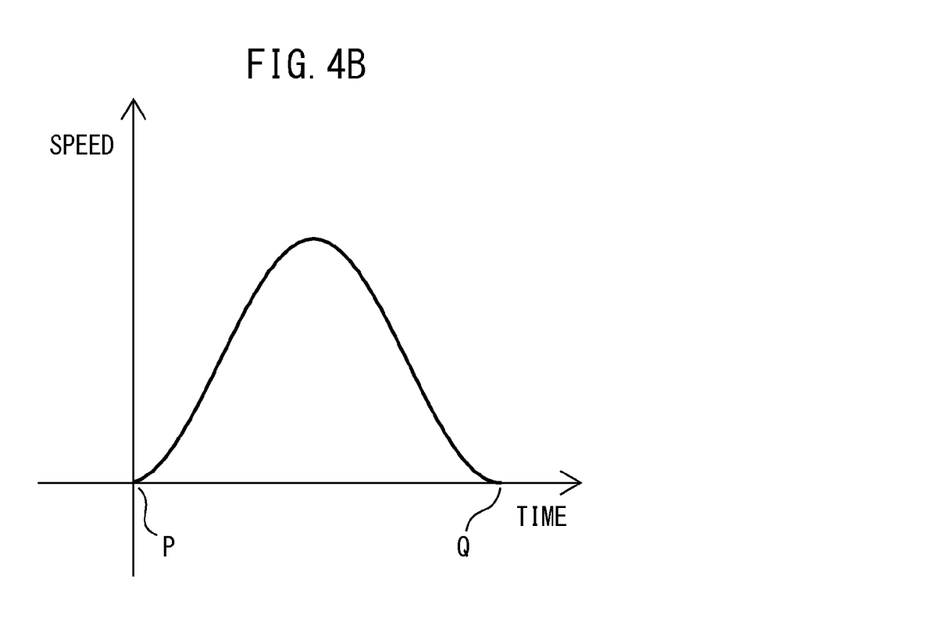
FIG. 4B is a graph illustrating a relationship between time and a speed during movement from a point P to a point Q illustrated in FIG. 4A.

FIG. 4B is a graph illustrating a relationship between time and a speed during movement from the point P to the point Q illustrated in FIG. 4A. The present invention employs the swing command F(t) or the swing command after multiplication F'(t) having a sine wave shape. Accordingly, as illustrated in FIG. 4B, a moving speed during the movement from the point P to the point Q changes relatively smoothly. This reduces torque at the time of acceleration/deceleration. Therefore, according to the present invention, an occurrence of undershoot or overshoot can be prevented at turns of the swinging operation.

Then, in step S5, the numerical controller 20 provides, based on the swing command F(t), the position command Pc1 and the reference angle ω to the first servo motor control unit 40a through a first supply unit 24 for each command distribution cycle T. Similarly, in step S6, the numerical controller 20 provides, based on the swing command after multiplication F'(t), the position command Pc2 and the reference angle ω to the second servo motor control unit 40b through a second supply unit 25 for each command distribution cycle T. Thus, the first servo motor control unit 40a and the second servo motor control unit 40b can perform angle synchronization control by referring to a common reference angle θ=ωt.

Note that, in steps S5 and S6, the swing command F(t) and the swing command after multiplication F'(t) may be directly supplied to the first servo motor control unit 40a and the second servo motor control unit 40b, respectively. In such a case, the first servo motor control unit 40a and the second servo motor control unit 40b respectively calculate the position commands Pc1 and PC2 from the swing command F(t) and the swing command after multiplication F'(t) for each command distribution cycle.

Then, in steps S7 and S8, the first position detector 82a detects a position of an output shaft of the first servo motor 80a. As illustrated in FIG. 1, the position information is fed back as a position feedback Pf1 to the first servo motor control unit 40a. A calculator 41a in the first servo motor control unit 40a subtracts the first position feedback Pf1 of the first servo motor 80a detected by the first position detector 82a from the first position command Pc1 to acquire first position error ϵ1.

Then, in steps S9 and S10, the second position detector 82b detects a position of an output shaft of the second servo motor 80b. The position information is fed back as a position feedback Pf2 to the second servo motor control unit 40b. A calculator 41b in the second servo motor control unit 40b subtracts the second position feedback Pf2 of the second servo motor 80b detected by the second position detector 82b from the second position command Pc2 to acquire second position error ϵ2. Note that steps S7 to S10 are executed for each sampling cycle.

Then, in step S11, a first repeat control unit 70a in the first servo motor control unit 40a performs repeat control based on the reference angle ωt, the swing command F(t), and the first position error ϵ1. Similarly, in step S12, a second repeat control unit 70b in the second servo motor control unit 40b performs repeat control based on the reference angle ωt, the swing command after multiplication F'(t), and the second position error ϵ2. The first repeat control unit 70a and the second repeat control unit 70b are synchronized with each other in angle.

Figure 5:
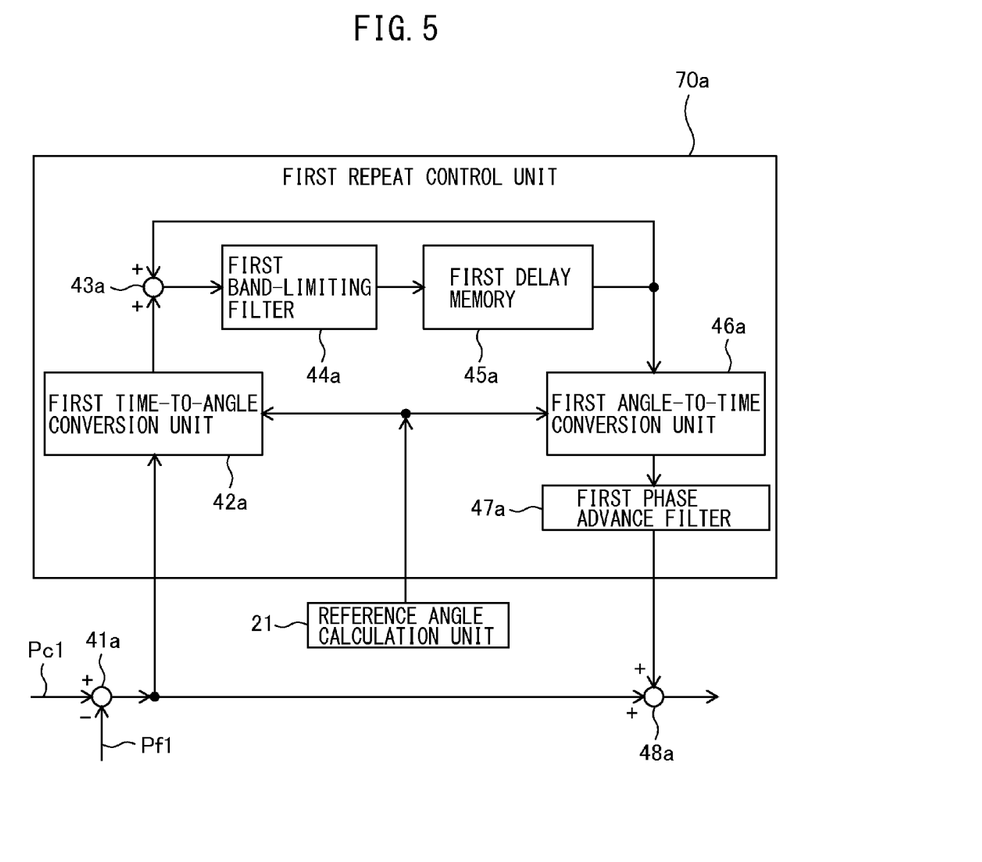
FIG. 5 is a block diagram illustrating a first repeat control unit illustrated in FIG. 1.

FIG. 5 is a block diagram illustrating the first repeat control unit illustrated in FIG. 1. As illustrated in FIG. 5, the first repeat control unit 70a includes a first time-to-angle conversion unit 42a, a first adder 43a, a first band-limiting filter 44a, a first delay memory 45a, a first angle-to-time conversion unit 46a, and a first phase advance filter 47a.

Figure 6:
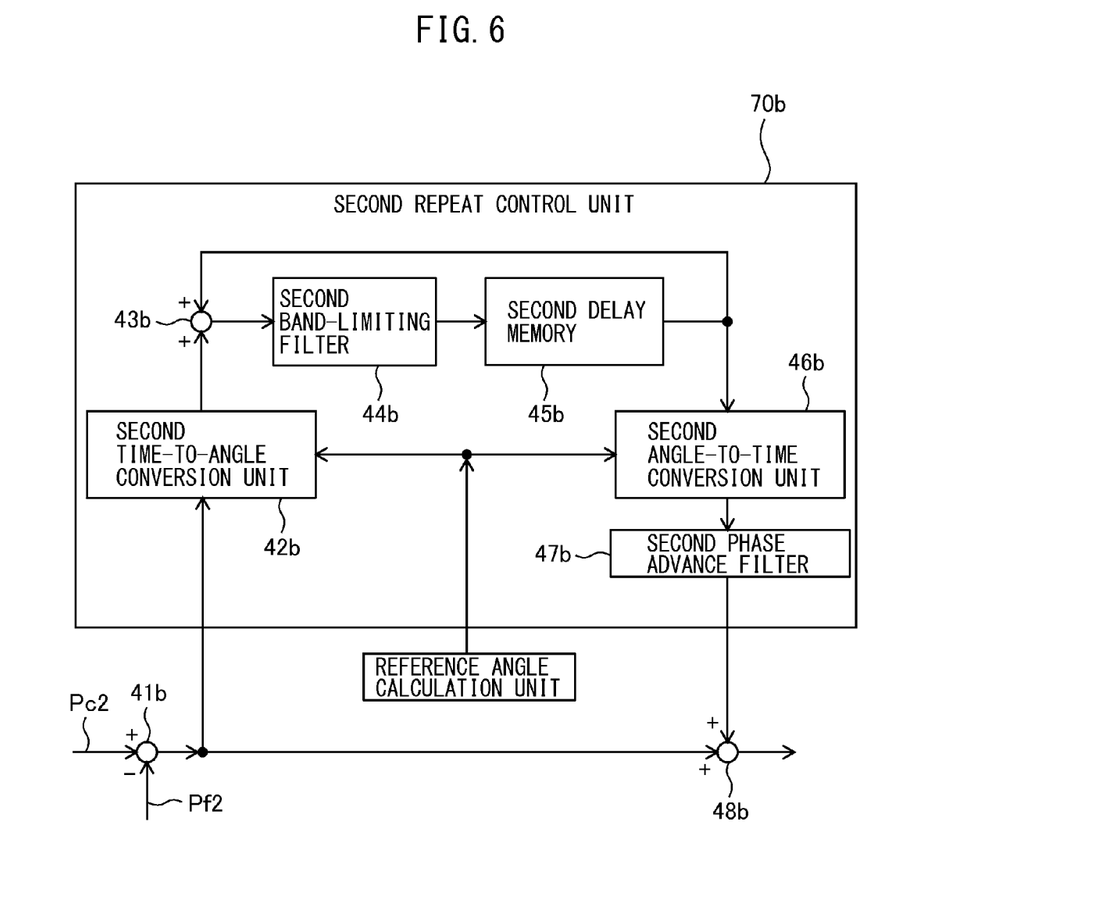
FIG. 6 is a block diagram illustrating a second repeat control unit illustrated in FIG. 1.

FIG. 6 is a block diagram illustrating the second repeat control unit illustrated in FIG. 1. As illustrated in FIG. 6, the second repeat control unit 70b includes a second time-to-angle conversion unit 42b, a second adder 43b, a second band-limiting filter 44b, a second delay memory 45b, a second angle-to-time conversion unit 46b, and a second phase advance filter 47b.

Figure 7:
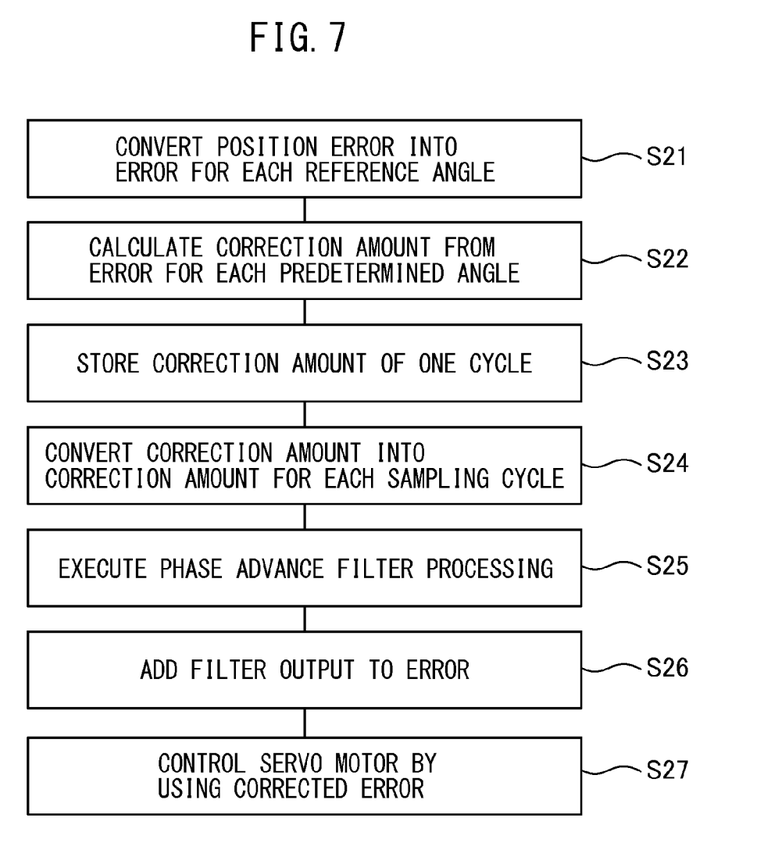
FIG. 7 is a flowchart describing repeat control.

FIG. 7 is a flowchart illustrating repeat control. Contents illustrated in FIG. 7 are common in the first repeat control unit 70a and the second repeat control unit 70b. Hereinafter, only the first repeat control unit 70a will be described referring to FIGS. 4 to 7, however, it is to be understood that the content for the second repeat control unit 70b is generally the same.

First, in step S21 illustrated in FIG. 7, the first time-to-angle conversion unit 42a converts, by using the first position error ϵ1 for each sampling cycle and the reference angle θ(=ωt), the position error into a first position error ϵ1 for each predetermined angle. The adder 43a adds the first position error ϵ1 at each of predetermined angles θ'(m) (m=1, 2, 3, . . . mmax) acquired by the first time-to-angle conversion unit 42a, and a correction amount at a corresponding predetermined angle θ'(m) before one pattern cycle stored in the first delay memory 45a.

Then, in step S22, the first band-limiting filter 44a performs filter processing on an output of the adder 43a to acquire a correction amount. Subsequently, in step S23, the correction amount of each predetermined angle θ'(m) is output to the first delay memory 45 which stores the correction amounts for 360° (one cycle) of the reference angles, and the correction amount is stored in the first delay memory 45.

Then, in step S24, the first angle-to-time conversion unit 46a reads a correction amount corresponding to the reference angle θ (=ωt) out of respective predetermined angles θ'(m) in the first delay memory 45a, and converts the read correction amount into a correction amount a reference of which is time from a correction amount a reference of which is an angle. the correction amount converted into the correction amount based on the time by the first angle-to-time conversion unit 46a is compensated for a phase delay of a control target by the first phase advance filter 47a, and output to the calculator 48a (step S25). In step S26, the calculator 48a adds the correction amount from the first repeat control unit 70a to the first position error ϵ1.

The first time-to-angle conversion unit 42a and the first angle-to-time conversion unit 46a will be described more specifically. The first time-to-angle conversion unit 42a converts the first position error ϵ1 acquired for each sampling cycle (for each position, speed loop processing cycle) into first position error at the reference angle θ'(m).

The first delay memory 45a can store the correction amount of the predetermined angle position θ'(m) for each predetermined angle where one pattern cycle of an operation of a repeatedly instructed processing shape or the like has been divided. Supposing that one pattern cycle is 2π and a division width is d, the first delay memory 45a includes at least (2π/d) memory units. For example, assuming (2π/D)=q, the first delay memory 45a stores correction amounts at the respective angles θ'(m) from θ(0)=0=2π to angle θ(q−1)=2π−d in the pattern.

The first angle-to-time conversion unit 46a acquires, for each sampling cycle, a correction amount δ(n) for the sampling timing by executing interpolation processing on the correction amounts at the reference angles θ'(m) before and after the reference angle on the basis of the reference angle θ(n) acquired at the sampling cycle. The correction amount δ(n) means a correction amount for the sampling timing, and is a time-basis.

In step S27 illustrated in FIG. 7, the servo motor is controlled by using the corrected error. Specifically, as illustrated in FIG. 1, the correction amount from the first repeat control unit 70a is added to the first position error el at the calculator 48a, thereby correcting the first position error ϵ1. Then, the corrected first position error ϵ1' is multiplied by a position gain Kp (49) to acquire a speed command Vc1, and so-called position loop control processing is performed.

Similarly, the correction amount from the second repeat control unit 70b is added to the second position error ϵ2 at the calculator 48b, thereby correcting the second position error ϵ2. Then, the corrected second position error ϵ2' is multiplied by a position gain Kp (49) to acquire a speed command Vc2, and so-called position loop control processing is performed.

Subsequently, speed loop control processing is performed on the speed commands Vc1 and Vc2 by a speed controller (not illustrated) to acquire a current command. Current loop control processing is performed by a current controller (not illustrated) based on the current command and a current feedback amount fed back from a current detector not illustrated. Each of the first servo motor 80a and the second servo motor 80b is applied driving control via a current amplifier (not illustrated).

Thus, according to the present invention, the swing command F(t) is employed in the X-direction swing shaft, and the swing command after multiplication F'(t) acquired by multiplication by the ratio according to the tilt angle β of the inclined surface is employed in the Y-direction swing shaft. The swing command F(t) and the swing command after multiplication F'(t) use the common reference angle ωt, and thus the grindstone G or the workpiece W is swung in synchronization. According to the present invention, the first position error ϵ1 and the second position error ϵ2 are corrected based on the angle information of the swing command F(t) and the swing command after multiplication F'(t), and the grindstone or the workpiece is repeatedly controlled in the X direction and the Y direction based on the corrected first position error ϵ1 and the corrected second position error ϵ2.

Thus, according to the present invention, the inclined surface can be ground without needing any tilt shaft. Therefore, the servo control system 10 of the present invention can be applied to an existing machine tool or industrial machine including two swing shafts orthogonal to each other, and the inclined surface can be ground without needing any tilt shaft.

Figure 8:
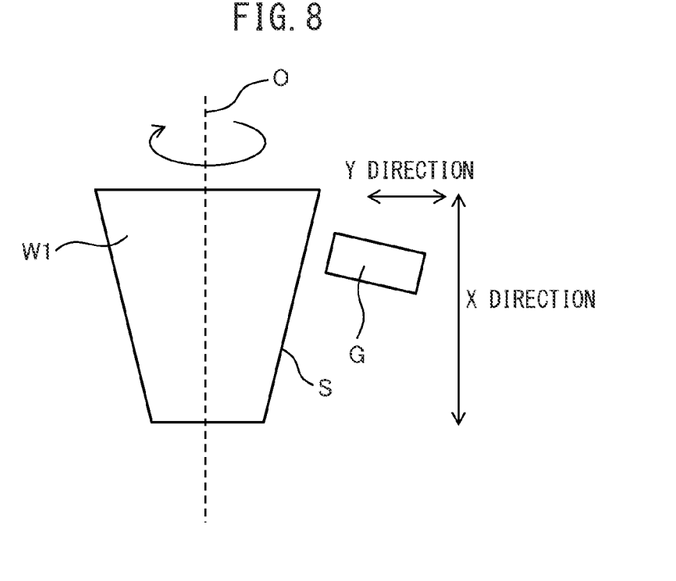
FIG. 8 is a diagram illustrating another example to which the servo control system of the present invention is applied.

In FIG. 2, the servo control system 10 of the present invention is applied for grinding a flat inclined surface. However, as illustrated in FIG. 8, for example, even when a conical surface S of a conical or truncated cone workpiece W1 is ground, the servo control system 10 of the present invention can be applied.

In this case, the conical or truncated cone workpiece W1 is rotated around a center axis O thereof, and the grindstone G is swung in an axial direction (X direction) and a radial direction (Y direction) of the workpiece W1. As obvious to those skilled in the art, such a case is within the scope of the present invention.

Effects of the Invention

According to a first aspect, the swing command of one swing shaft is multiplied by the ratio according to the tilt angle of the inclined surface, and the first swing shaft and the second swing shaft are synchronized with each other based on the common reference angle. The position error is corrected based on the angle information of the swing command, and the control is repeatedly executed based on the corrected position error. As a result, the inclined surface can be ground without needing any tilt shaft.

According to a second aspect, generation of the correction amount depending on the angle enables following the change of the angular speed.

According to a third aspect, the sine wave shape of the swing command reduces the torque at the time of acceleration/deceleration. Thus, even in the case of a high-speed operation along the swing shaft, servo responsiveness is improved. As a result, an occurrence of undershoot or overshoot at turns can be prevented.

While the present invention has been described with the exemplary embodiments, as obvious to those skilled in the art, the above changes, various other changes, omissions, and additions can be made without departing from the disclosed scope of the present invention.

What is claimed is:

1. A servo control system for controlling a servo motor of a machine tool for grinding an inclined surface of a material to be ground by a grindstone, the servo control system comprising:

a first servo motor configured to swing one of the grindstone and the material to be ground along a first swing shaft;

a first position detection unit configured to detect a position of the first servo motor;

a first servo motor control unit configured to control the first servo motor;

a second servo motor configured to swing the one of the grindstone and the material to be ground along a second swing shaft perpendicular to the first swing shaft;

a second position detection unit configured to detect a position of the second servo motor;

a second servo motor control unit configured to control the second servo motor;

a reference angle calculation unit configured to calculate a reference angle based on a command angular speed and a command distribution cycle acquired from processing conditions;

a swing command calculation unit configured to calculate a cyclical swing command based on the processing conditions and the reference angle;

a first supply unit configured to supply the reference angle and the swing command to the first servo motor control unit;

a first position error calculation unit configured to calculate a first position error between the swing command and the position of the first servo motor detected by the first position detection unit for each sampling cycle;

a first repeat control unit configured to execute repeat control for the first servo motor based on the reference angle, the swing command, and the first position error;

a multiplication unit configured to multiply the swing command by a ratio according to a tilt angle of the inclined surface of the material to be ground to calculate a swing command after multiplication;

a second supply unit configured to supply the reference angle and the swing command after multiplication to the second servo motor control unit;

a second position error calculation unit configured to calculate a second position error between the swing command after multiplication and the position of the second servo motor detected by the second position detection unit for each sampling cycle; and a second repeat control unit configured to execute repeat control for the second servo motor based on the reference angle, the swing command after multiplication, and the second position error, wherein the first repeat control unit and the second repeat control unit respectively correct the first position error and the second position error, and control driving of the first servo motor and the second servo motor based on the corrected first position error and the corrected second position error, thereby grinding the inclined surface of the material to be ground.

2. The servo control system according to claim 1, wherein:

the first repeat control unit includes:

a first time angle conversion unit configured to convert the first position error acquired for each sampling cycle into an error for each reference angle;

a first correction amount calculation unit configured to calculate a correction amount in the reference angle from the error for each reference angle;

a first correction amount storage unit configured to store correction amounts at least for one cycle of the grindstone or the material to be ground, which is cyclically swung;

a first angle time conversion unit configured to convert the correction amount stored in the first correction amount storage unit into a correction amount for each sampling cycle; and a first phase advance filer configured to advance a phase of the converted correction amount converted by the first angle time conversion unit, and the second repeat control unit includes:

a second time angle conversion unit configured to convert the second position error acquired for each sampling cycle into an error for each reference angle;

a second correction amount calculation unit configured to calculate a correction amount in the reference angle from the error for each reference angle;

a second correction amount storage unit configured to store correction amounts at least for one cycle of the grindstone or the material to be ground, which is cyclically swung;

a second angle time conversion unit configured to convert the correction amount stored in the second correction amount storage unit into a correction amount for each sampling cycle; and a second phase advance filer configured to advance a phase of the converted correction amount converted by the second angle time conversion unit.

3. The servo control system according to claim 1, wherein the swing command has a sine wave shape.

* * * * *